Figures 5, 6:
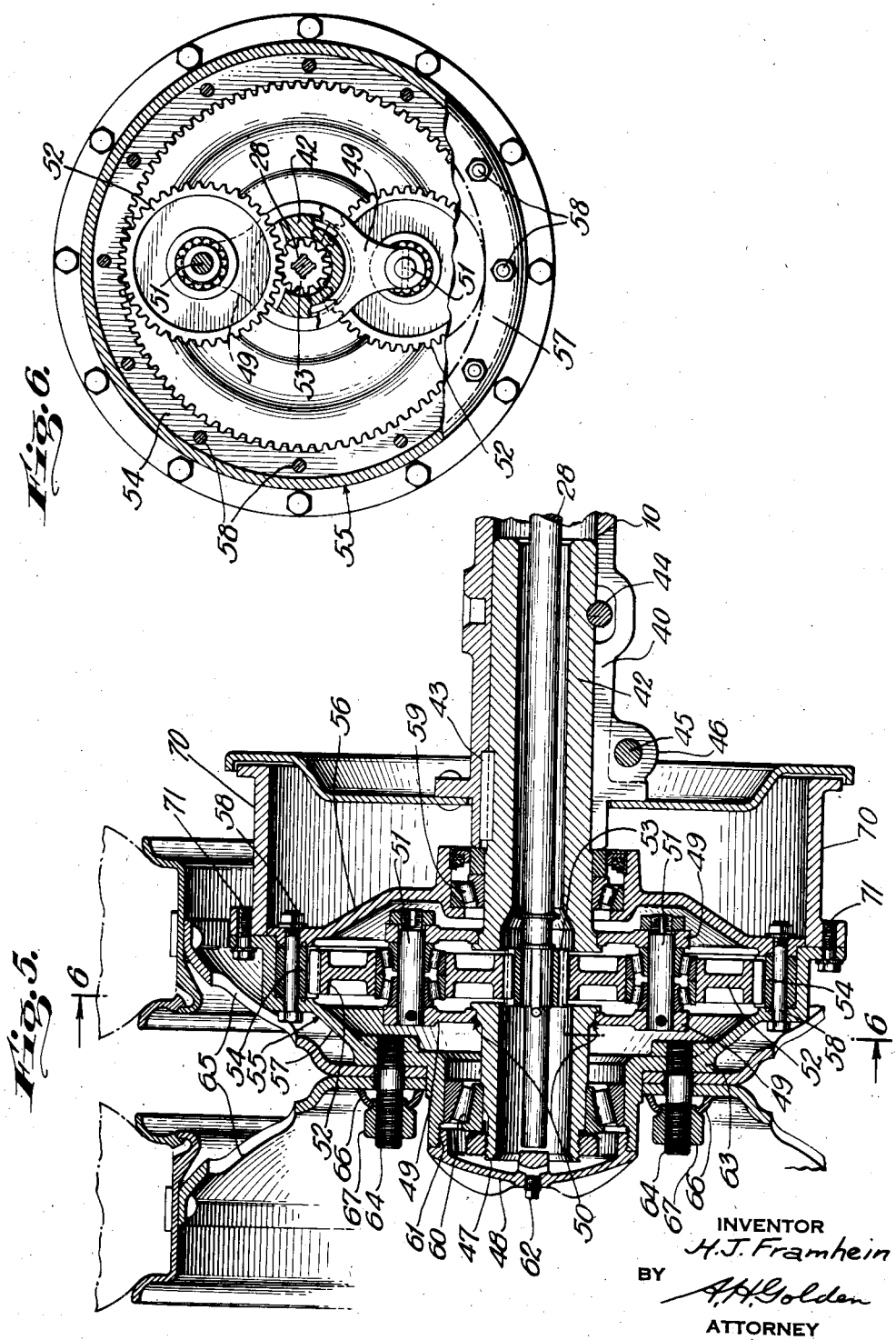

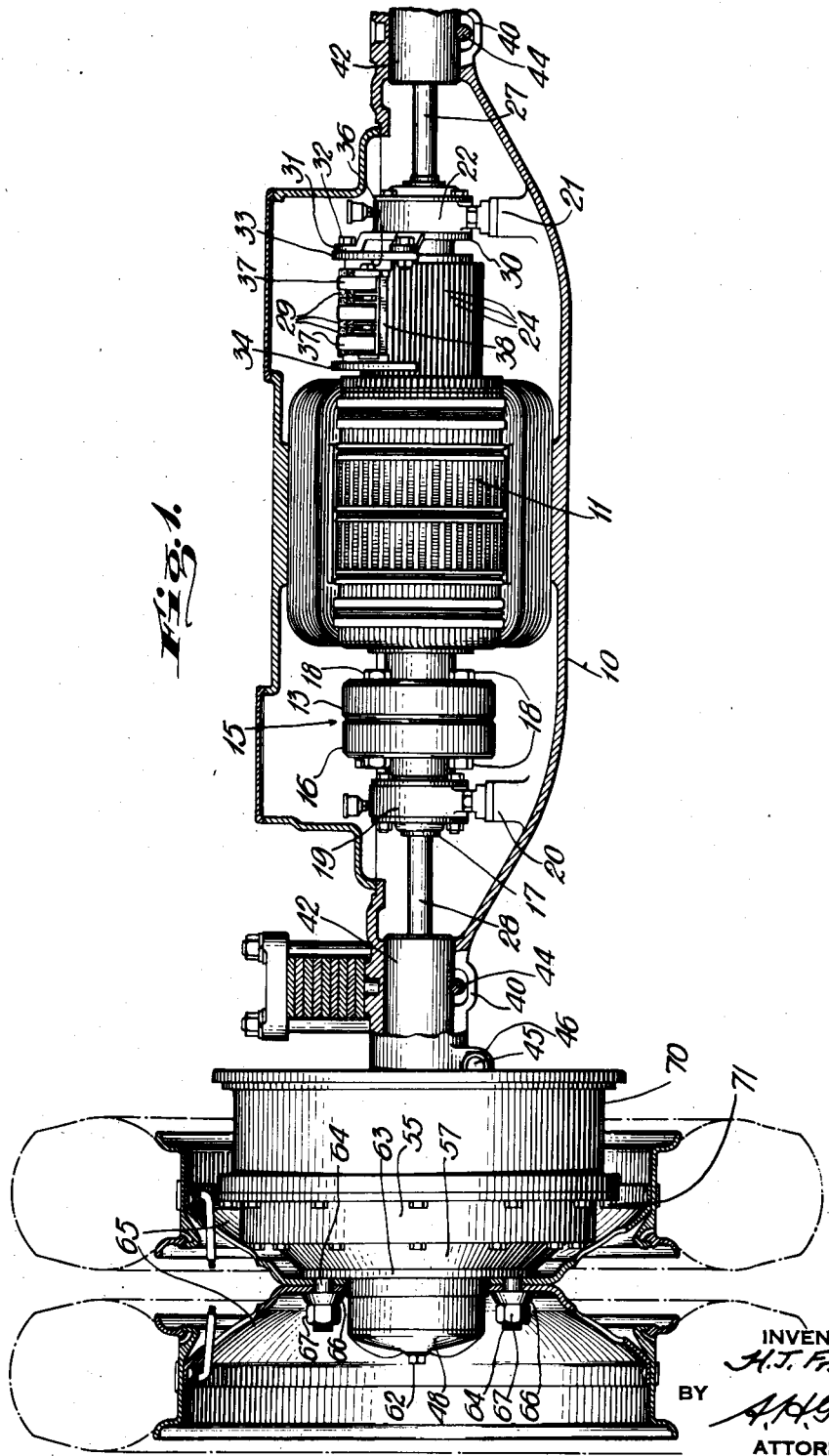

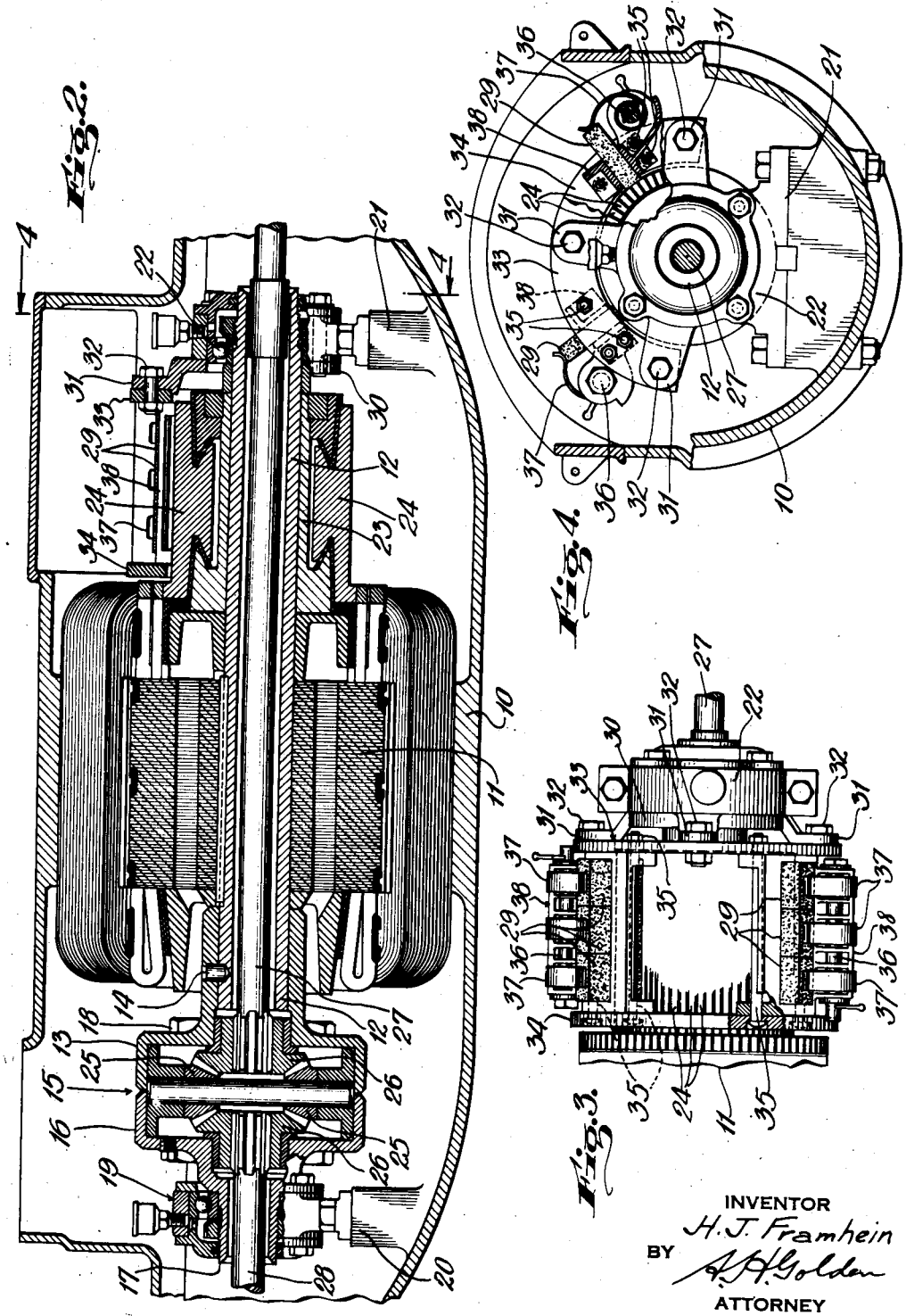

June 10, 1941.    H. J. FRAMHEIN    2,244,875
REAR END CONSTRUCTION
Filed July 21, 1938    3 Sheets-Sheet 3

INVENTOR
H. J. Framhein
BY
A. H. Golden
ATTORNEY

Patented June 10, 1941

2,244,875

UNITED STATES PATENT OFFICE 2,244,875

REAR END CONSTRUCTION

Herbert J. Framhein, Chicago, Ill., assignor to The Yale & Towne Manufacturing Company, Stamford, Conn., a corporation of Connecticut Application July 21, 1938, Serial No. 220,432

12 Claims. (Cl. 172—36)

This invention relates to the rear end construction of an electrically driven vehicle, and more especially to an improvement in the well known Walker rear end drive, one showing of which is presented in the Carroll Patent No. 1,570,941 owned by the Walker Vehicle Company, the owner of this application.

A rear end drive of the class described comprises a housing in which is mounted an electric motor, which through a differential and a pair of shafts drives wheels mounted at each end of the housing. In the constructions prior to my invention, it was customary to mount the armature of the electric motor on a quill, the quill being in turn removably mounted on a rotatable hollow shaft. This hollow shaft was in turn mounted at its opposite ends on bearing supports extending from the housing. One end of the hollow shaft extended beyond its bearing, and was connected to a differential housing for actuating that housing. Extending from the differential housing, there were a pair of drive shafts, one of which traversed the hollow shaft for driving the wheel at one end of the housing, while the other shaft extended through the housing to drive the wheel at the other end thereof.

Because, in the prior art, the differential housing is secured to one end of the hollow shaft beyond its bearing, the bearing can not be replaced without removal of the hollow shaft. It is essential, therefore, that the armature and its quill be separable from the hollow shaft, and it is for that reason, as was indicated previously, that they are made separable. This, of course, requires rather accurate machining of the quill, and also of the hollow shaft, and also requires an expensive hydraulic press for uniting and separating the two.

In my invention, the armature is mounted directly on the hollow armature shaft instead of through the intermediary of a quill, this being possible to do because of the new construction I have devised. Connected to my hollow shaft through suitable means is the differential casing, which differential casing in turn terminates in a portion which is mounted in a bearing extending from the housing. This bearing acts therefor to support the differential casing and the hollow armature shaft at one end thereof.

At its other end, the hollow shaft is supported on a second bearing extending from the housing. Further, in my construction, I am able to mount the commutator segments on a separate quill which in turn is inserted upon the hollow shaft. In prior constructions, when it was required to use a quill for the armature, it was necessary to mount the commutator on the same quill as the armature. As a feature of my new construction, I am able to mount my commutator on its own quill, thus allowing for more economical manufacture, as will be appreciated.

In the prior art constructions, it was customary to mount the commutator brushes on an arm extending from one of the surfaces of the rear end housing. In my new construction, I mount my brushes on a bracket supported from one of the bearings for the hollow armature shaft extending from the rear end housing. Since this bearing is necessarily machined accurately, it lends itself readily to some slight extra amount of machining to fit it for supporting a bracket, which bracket carries the commutator brushes. The advantages of this construction will of course be obvious to those skilled in the art.

As a further feature of my construction, I have adapted the rear end of the Walker drive so that it will lend itself for cooperation with modern disk wheels of small diameter using low pressure tires of considerable width. For this purpose, I mount at each end of my rear end housing a gear case of special design, adapted to be rotated as a unit by a drive shaft. Each gear case is formed, preferably, by the securing together of a main casing plate and a secondary casing plate. The main case plate carries the disk wheel which is secured thereto by a series of bolts extending circularly around the outside face of the plate. The brake drum is also secured to this same main plate. Because of this relation of the parts, the braking stresses as well as the driving stresses are transmitted to the wheel through a minimum of joints, thus making possible the use of my new combination of parts.

Also, because of the relation of the wheel fastening means to the gear case, either one of two types of disk wheels may be used, or the two types may be used together. Thus, one type of disk wheel is dished in one direction yielding a relatively narrow gauge, while another type is reversely dished giving a wider gauge. Also, both types may be used together. Because of this construction, it is readily seen that I am able to use any one of three combinations of disk wheels on my truck, while using but one rear end construction.

I shall now refer to the drawings wherein is shown a preferred modification of my invention. In the drawings, Fig. 1 is a partial section and elevation of my rear end housing showing the wheels and tires and gear casing at one end thereof. Fig. 2 is an enlarged detailed section illustrating the construction of the motor, the commutator, and the mounting thereof relatively to the differential. Fig. 3 is a view looking downwardly on the commutator and commutator brushes. Fig. 4 is a partial section and elevation along lines 4—4 of Fig. 2. Fig. 5 is a vertical section through that portion of Fig. 1 illustrating the wheel mounting. Fig. 6 is a partial section along lines 6—6 of Fig. 5.

Referring now more particularly to the drawings and especially Figs. 1 and 2, reference numeral 10 indicates my rear end housing which is formed of two halves suitably united in a manner which forms no part of this invention. An armature 11 of suitable commercial construction is formed about a hollow shaft 12, which shaft is formed at one end integrally with a flange 13, or may be united to that flange 13 by a series of fastening rivets 14, or by welding or any other means.

The flange 13 here forms substantially half of a differential casing, designated generally by reference numeral 15, the other half of the casing being formed from a member 16 substantially the same in shape as the flange 13, the member 16 terminating in a hollow shaft portion 17. The two parts 13 and 16 of the housing 15 are united by a series of bolts 18, or in any other way that may be preferred. When so united, the hollow shaft portion 17, the two parts 16 and 13, and the hollow shaft 12 form a single unit. It is, of course, within the scope of my contribution to form this assembly in any other way which may yield the results I require, and many different constructions will immediately suggest themselves to anyone skilled in this art.

The shaft portion 17 is supported through bearing 19 on a bearing support 20 extending from housing 10, the bearing assembly being of a suitable commercial form, the specific construction being not important here. The other end of the hollow shaft 12 is supported in a bearing support 21 through bearing 22 much in the same manner as is supported the shaft portion 17. A commutator quill 23 is forced on to the hollow shaft 12, the commutator quill in turn supporting the commutator segments 24 for rotation integrally with the armature 11, all as will be quite readily understood by those skilled in the art.

Because of the arrangement so far described, armature 11 will rotate with the hollow shaft 12 on bearing 22 at one end, and relatively to bearing 19 on bearing support 20 at its other end, through the intermediary, of course, of the hollow shaft portion 17. This will rotate the differential casing 15 and its usual pinions 25, which in turn will rotate either one or both of the gears 26, depending upon the relation of the wheels, all in the manner of a standard differential, it being of course understood that the specific construction of the differential is not of the essence in a consideration of my invention.

The gears 26 in turn are connected at one side of the differential to a drive shaft 27, and at the other side to a drive shaft 28. The drive shaft 27 traverses the entire length of the hollow shaft 12, but is spaced therefrom. This spacing is of importance since it makes it unnecessary to finish accurately the inside of the shaft 12, and makes it possible to spray and bake the armature without fear of any coating being applied to the inside of the shaft 12.

It will now be apparent that because of the construction so far described, it is comparatively simple to replace either of the bearings of shaft 12, without in any way disturbing the assembly of the armature on its shaft, thus contributing much to the prior art. Also, it is evident that because of my construction, it is possible to assemble the commutator segments on their own quill 23 without enlarging unduly the diameter of the entire commutator assembly.

As pointed out earlier in this specification, in prior art constructions, it has been usual to mount the commutator brushes on a bracket carried by a wall of the rear end housing 10. I depart from this construction by utilizing the bearing support 21 for supporting also the commutator brushes, designated by reference numeral 29 (Figs. 3 and 4). For this purpose, there is secured to my bearing 21 a support member 30 formed with three arms 31, supporting through holes 32 an arcuate bracket 33, at one end of the commutator assembly. A second bracket 34 is supported at the other end of the commutator assembly through bolts 35 connecting it to the first bracket 33, all as will be quite clear from an examination of the drawings.

The brackets 33 and 34 are maintained in proper spaced relation by brush supporters 38 which are secured between brackets 33 and 34. The brush supporters carry shafts 36 on which are mounted springs 37 which bear on the brushes 29, which brushes are slidably mounted in bores of the brush supporters 38, the springs holding the brushes against the commutator segments 24, all as is standard practice. Because of the utilization of the bearing support 21 for the purpose indicated, many economies of manufacture are obtained, as was explained in the first part of the specification, also a much more satisfactory assembly.

Referring now to Figs. 5 and 6, I illustrate the manner in which I mount either one or both of two types of disk wheels at each end of my rear end housing. Also, in Figs. 5 and 6, I show the preferred construction of the gear casings and the mounting thereof whereby I am enabled to use disk wheels in the combination shown. I shall describe the mounting of a gear casing and its wheels at but one end of the housing, it being understood that the mounting at each end is exactly the same.

The housing 10 is saw-cut as at 40 so that there may be inserted a suitable stub axle 42, which is keyed to the housing at 43, and is secured against endwise movement in the housing by a pin 44. The stub axle is further held by binding of the housing thereto through the bolt 45 which passes through the two ears 46 extending from the saw-cut portion of the housing and draws the housing together. This construction per se is not part of my invention.

The stub axle 42 terminates at 47 just short of hub cap 48. A pair of ears 49 extend from each of opposite points of the stub axle, these ears being secured as by welding at 50 to the stub axle. Between the ears of each pair of ears, there extends a bearing shaft 51 which in turn supports an idler gear 52 through suitable roller bearings. The pair of idler gears 52 thus carried on the pairs of ears 49 are driven by a pinion 53 which is formed on the drive shaft 28. The idler gears 52 are in turn in driving relation to a ring gear 54.

This ring gear is mounted about the inner periphery of a gear casing designated generally by reference numeral 55. The gear casing 55 is formed of a secondary case plate 56, and a main case plate 57, the two being joined to one another and simultaneously to the ring gear 54 by a series of bolts 58. The gear casing thus formed is supported through the plate 56 by a bearing 59 on the stub axle 42 at the one side. At its outer side, the gear casing 55 is supported through its main case plate 57 on the bearing 60 relatively to the outer end of the stub axle 42. The hub cap 48 previously described is mounted on screw threads 61 formed on the main plate 57 of the gear casing and covers the end thereof, it being provided with a plug 62 covering an opening through which lubricating material may be inserted.

From the structure so far described, it will be readily appreciated that when drive shaft 28 is rotated, it will through its gear pinion 53 rotate the idler gears 52, which in turn will rotate the ring gear 54 and therefore the gear casing 55, this rotation of the gear casing 55 being about the stub axle 42.

The main case plate 57 of the gear casing 55 is formed with a series of built up portions 63 threaded for the securing thereto of a series of bolts 64. Due to the shape of the main case plate 57 and thus of the gear case, the bolts will be secured in comparatively close relation to the extension of the stub axle 42, this being important since the bolts are adapted to support disk wheels, which wheels it is desired shall be relatively small in diameter. Because of the placing of the bolts in the positions indicated, this being possible through the proper shaping of the casing, a disk wheel having a relatively wide flange may be used, despite the fact that the disk wheel itself is of small diameter. This is of importance in the particular assembly, and is one of the contributing features making it possible in an electric drive of the Walker type to use disk wheels with relatively wide pneumatic tires.

A brake drum 70 is also secured directly to the main case plate 57 by a series of bolts 71. This is made possible by the shape of the said main case plate and its relation to the entire assembly. Braking effort applied to drum 70 will thus be transmitted to the wheel 65 through a minimum of parts and connections. This contribution will best be appreciated if it is considered that were I to use a conventional structure such as is usual in the art, it would be impossible to use my wheel assembly successfully because of the tendency for the braking stresses to loosen the connections between the parts. Such loosening would cause leakage of lubricant and a general breaking down of the entire rear end construction, while to a lesser degree, the construction I have shown also resists any loosening of the parts incidental to driving stresses.

As pointed out generally previously in this specification, I use a type of disk wheel designated by reference numeral 65, secured through securing lugs 66 and nuts 67 on the series of bolts 64. I may use one wheel applied as is the right hand wheel of Figs. 1 and 5, or as is the left hand wheel of Figs. 1 and 5. If I wish, I may use two wheels as shown. Thus, also, because of my construction, I need stock but one type of rear end, and yet provide customers with three types of wheel mounting combinations.

The advantages of my construction will now be clearly understood. It will also be quite apparent that my contribution may take one or more of several specific forms, and I do not wish to be limited therefore to any one form, but rather wish my monopoly to be limited only as required by the state of the art.

I now claim:

1. A rear end construction of the class described comprising a housing, a shaft in said housing, an armature on said shaft, a bearing support formed on said housing for supporting the said shaft at one end, a differential casing secured to the other end of said shaft as a continuation of said shaft, a second bearing support on said housing, said bearing support cooperating with a portion of the differential casing on that side of said casing opposite the side nearest the armature, for supporting the shaft at its other end, while leaving said last bearing accessible for ready replacement.

2. A rear end construction of the class described comprising a housing, a hollow shaft in said housing, an armature on said hollow shaft, a bearing support formed on said housing for supporting the said hollow shaft at one end, a differential casing secured to the other end of said shaft as a continuation of said shaft and itself terminating in a hollow shaft, and a second bearing support on said housing for said second hollow shaft, said two bearing supports comprising the supports on which said shafts, differential casing and armature rotate as a unit.

3. A rear end construction of the class described comprising a housing, a hollow shaft in said housing, an armature on said hollow shaft, a bearing support formed on said housing for supporting the said hollow shaft at one end, a differential casing secured at the other end of said shaft as a continuation of said shaft and itself terminating in a hollow shaft, a second bearing support on said housing for said second hollow shaft, said two bearing supports comprising the supports on which said shafts, differential casing and armature rotate as a unit, and drive shafts extending in opposite directions from said differential casing through said hollow shafts.

4. A rear end construction of the class described comprising a housing, a hollow shaft in said housing, an armature on said hollow shaft, a bearing support formed on said housing for supporting the said hollow shaft at one end, a differential casing secured to the other end of said shaft and itself terminating in a hollow shaft, another bearing support on said housing for supporting said second hollow shaft and therefore the other end of said first shaft and armature, and drive shafts driven from said differential and extending in either direction from said differential and through said hollow shafts.

5. A rear end construction of the class described comprising a housing, a hollow shaft in said housing, an armature on said hollow shaft, a bearing support formed on said housing for supporting the said hollow shaft at one end, a differential casing, the other end of said shaft being joined to one side of said differential casing as a continuation thereof, a bearing support in said housing for the other side of said differential, and only through which the differential casing and the other end of said hollow shaft are supported for rotation as a unit.

6. A rear end construction of the class described comprising a housing, a hollow shaft in said housing, an armature on said hollow shaft, a bearing support formed on said housing for supporting the said hollow shaft at one end, a differential casing, the other end of said shaft being joined to one side of said differential casing leaving a passage from said casing to the inside of said shaft, a second hollow shaft joined to the other side of said differential casing also leaving a passage through the inside of said shaft to said differential casing, a bearing support in said housing for said second hollow shaft and only through which the differential casing and the other end of said first hollow shaft are supported for rotation as a unit, and drive shafts driven from said differential and extending in either direction from said differential and through said hollow shafts.

7. A rear end construction of the class described comprising a housing, a hollow shaft in said housing, an armature built directly on to said hollow shaft to form a unitary assembly therewith, a bearing support formed on said housing for supporting the said hollow shaft at one end, a differential casing secured to the other end of said shaft as an extension thereof for rotation therewith itself terminating in a hollow shaft, and another bearing support on said housing for supporting said second hollow shaft and therefore said first shaft and armature, and drive shafts extending in opposite directions from said differential casing through said hollow shafts.

8. A rear end construction of the class described comprising a housing, a hollow shaft in said housing, an armature on said hollow shaft, a bearing support formed on said housing for supporting the said hollow shaft at one end, a diffential casing secured to the other end of said shaft to rotate integrally therewith, a bearing support for the other side of said differential casing and only through which the other end of said shaft is supported, and drive shafts extending in opposite directions from said differential casing through said hollow shaft and through said other side of the differential casing.

9. A rear end construction of the class described comprising a housing, a hollow shaft in said housing, an armature and a commutator on said hollow shaft, a bearing support for said hollow shaft extending from said housing to support the shaft at a point juxtaposed to the commutator thereon, commutator brushes, and means on said bearing support for supporting also said brushes for cooperation with said commutator.

10. A rear end construction of the class described comprising a housing, a shaft in said housing, an armature on said shaft for effecting the rotation of said shaft, a bearing support formed on said housing for supporting one end of said shaft, a bearing formed on said housing supporting the other end of said shaft, and a differential casing formed as part of said shaft and positioned between one of said bearings and the armature.

11. A rear end construction of the class described comprising a housing, a hollow shaft in said housing, an armature formed on said shaft for effecting the rotation of said shaft, a bearing support formed on said housing for supporting one end of said shaft, a bearing formed on said housing supporting the other end of said shaft, a differential casing formed as part of said shaft and positioned between one of said bearings and the armature, drive shafts extending in opposite directions from said differential casing through each end of said hollow shaft, and means in said differential casing whereby rotation of said hollow shaft rotates said drive shafts.

12. A rear end construction of the class described comprising a housing, a hollow shaft in said housing, an armature formed on said shaft for effecting the rotation of said shaft, a bearing support formed on said housing for supporting one end of said shaft, a bearing formed on said housing supporting the other end of said shaft, a differential casing formed as part of said shaft positioned between one of said bearings and the armature, drive shafts extending in opposite directions from the said differential casing through each end of said hollow shaft, means in said differential casing whereby rotation of said hollow shaft rotates said drive shafts, traction wheels supported relatively to said housing, a pair of gears whereby each of said traction wheels is rotated, and a pinion on each of said drive shafts through which a pair of gears are rotated, said pair of gears holding said drive shaft in operative spaced relation to said hollow shaft through said pinions.

HERBERT J. FRAMHEIN.